(12) United States Patent
Zhu

(10) Patent No.: US 11,348,363 B2
(45) Date of Patent: May 31, 2022

(54) FINGERPRINT SCANNING METHOD AND MOBILE TERMINAL

(71) Applicant: VIVO MOBILE COMMUNICATION CO., LTD., Guangdong (CN)

(72) Inventor: Xianping Zhu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/037,322

(22) Filed: Sep. 29, 2020

(65) Prior Publication Data

US 2021/0012086 A1     Jan. 14, 2021

Related U.S. Application Data

(63) Continuation of application No. PCT/CN2019/080082, filed on Mar. 28, 2019.

(30) Foreign Application Priority Data

Mar. 30, 2018   (CN) .......................... 201810275991.2

(51) Int. Cl.
  *G06V 40/12*     (2022.01)
  *G06V 40/13*     (2022.01)
(52) U.S. Cl.
  CPC ...... *G06V 40/1365* (2022.01); *G06V 40/1312* (2022.01); *G06V 40/1306* (2022.01)

(58) Field of Classification Search
  CPC ........... G06K 9/00087; G06K 9/00033; G06K 9/0002; G06K 9/209; G06K 9/28;
  (Continued)

(56) References Cited

U.S. PATENT DOCUMENTS

2015/0277652 A1   10/2015   Kim
2016/0012273 A1   1/2016    Westerman et al.
(Continued)

FOREIGN PATENT DOCUMENTS

CN        104798311 A      7/2015
CN        105528592 A      4/2016
(Continued)

OTHER PUBLICATIONS

EP Search Report in Application No. 19774209.1 dated Apr. 19, 2021.
(Continued)

*Primary Examiner* — Abhishek Sarma
(74) *Attorney, Agent, or Firm* — Maschoff Brennan

(57) ABSTRACT

The present disclosure provides a fingerprint scanning method and a mobile terminal. The mobile terminal includes a first fingerprint scanning module and a second fingerprint scanning module. The method includes: monitoring an operation performed on a scanning area of the first fingerprint scanning module; when an operation instructing to enter a preset fingerprint application scenario is monitored, transmitting a wake-up instruction to the second fingerprint scanning module. The wake-up instruction is configured to instruct the second fingerprint scanning module to enter an operation mode.

20 Claims, 6 Drawing Sheets

(58) Field of Classification Search
CPC .......... G06K 9/00892; G06K 9/00912; G06K 9/3233; G06K 9/00013; G06F 21/32; G06V 40/1365; G06V 40/1312; G06V 40/1306; G06V 10/147; G06V 10/25; G06V 30/144; G06V 40/67; G06V 40/70; G06V 40/13

See application file for complete search history.

(56) References Cited

U.S. PATENT DOCUMENTS

| | | |
|---|---|---|
| 2016/0283019 A1 | 9/2016 | Shang |
| 2016/0379037 A1* | 12/2016 | Russo ................ G06K 9/00114 382/125 |
| 2017/0140201 A1 | 5/2017 | Li et al. |
| 2017/0336906 A1 | 11/2017 | Yoon et al. |
| 2018/0005005 A1 | 1/2018 | He et al. |
| 2019/0065808 A1 | 2/2019 | Zhang et al. |
| 2021/0012086 A1 | 1/2021 | Zhu |

FOREIGN PATENT DOCUMENTS

| | | |
|---|---|---|
| CN | 106529498 A | 3/2017 |
| CN | 106709405 A | 5/2017 |
| CN | 106845340 A | 6/2017 |
| CN | 106951884 A | 7/2017 |
| CN | 107590373 A | 1/2018 |
| CN | 107656665 A | 2/2018 |
| CN | 108647569 A | 10/2018 |
| JP | 2002-366056 A | 12/2002 |
| WO | 2015/056844 A1 | 4/2015 |

OTHER PUBLICATIONS

CN Office Action in Application No. 201810275991.2 dated Jul. 30, 2019.

International Search Report and Written Opinion in Application No. PCT/CN2019/080082 dated Oct. 15, 2020.

JP Office Action dated Dec. 7, 2021 as received in Application No. 2020-551509.

* cited by examiner

FINGERPRINT SCANNING METHOD AND MOBILE TERMINAL

CROSS-REFERENCE TO RELATED APPLICATION

This application is a continuation application of International Application No. PCT/CN2019/080082 filed on Mar. 28, 2019, which claims the benefit and priority of Chinese Application No. 201810275991.2, filed on Mar. 30, 2018, which is incorporated herein by reference in its entirety.

TECHNICAL FIELD

The present disclosure relates to the field of terminals, and in particular to a fingerprint scanning method and a mobile terminal.

BACKGROUND

Generally, the fingerprint recognition is to collect a pattern of a fingerprint surface through an array, in order to obtain a fingerprint image. At present, common fingerprint recognition technologies include capacitive, optical, and ultrasound, etc. Taking the capacitive fingerprint recognition technology operable by mobile terminals as an example, a touch screen contains approximately ten thousand miniaturized capacitors therein to form a capacitor array, as shown in FIG. 1. When a user puts his or her finger on the touch screen, the skin and a conductive plate of the touch screen form a capacitor. Since distances between ridges and valleys at different positions of the fingerprint are not equal, capacitance of each unit changes with the unequal distance between the ridges and valleys of the fingerprint. Different voltages are generated according to the different capacitances of various units, and then the fingerprint image can be obtained.

However, when faced with some specific fingerprint application scenarios with high security requirements, such as opening an app of bank, payment, remittance, a resolution provided by a current full-screen fingerprint recognition solution may not meet the security requirements. If the resolution is improved by increasing a density of the array in the touch screen, for example, replacing N×M capacitor array with 2N×2M capacitor array, it will greatly increase a power consumption of the mobile terminal, and then affect endurance of a battery of the mobile terminal.

Thus, there is a problem in the related art that high resolution and low power consumption cannot be simultaneously satisfied.

SUMMARY

Embodiments of the present disclosure provide a fingerprint scanning method, which can solve the problem in the related art that high resolution and low power consumption cannot be simultaneously satisfied.

In order to solve the above technical problem, the present disclosure is implemented as follows.

In a first aspect, a fingerprint scanning method is provided and operable by a mobile terminal which includes a first fingerprint scanning module and a second fingerprint scanning module. The method includes:

monitoring an operation performed on a scanning area of the first fingerprint scanning module;

when an operation instructing to enter a preset fingerprint application scenario is monitored, transmitting a wake-up instruction to the second fingerprint scanning module, wherein the wake-up instruction is configured to instruct the second fingerprint scanning module to enter an operation mode;

wherein the scanning area of the first fingerprint scanning module is greater than a scanning area of the second fingerprint scanning module; and a resolution of the second fingerprint scanning module is greater than a resolution of the first fingerprint scanning module.

In a second aspect, a mobile terminal is provided and includes:

a first fingerprint scanning module;

a second fingerprint scanning module;

a monitoring module configured to monitor an operation performed on a scanning area of the first fingerprint scanning module;

a first transmission module configured to, when an operation instructing to enter a preset fingerprint application scenario is monitored, transmit a wake-up instruction to the second fingerprint scanning module, wherein the wake-up instruction is configured to instruct the second fingerprint scanning module to enter an operation mode;

wherein the scanning area of the first fingerprint scanning module is greater than a scanning area of the second fingerprint scanning module; a resolution of the second fingerprint scanning module is greater than a resolution of the first fingerprint scanning module.

In a third aspect, a mobile terminal is provided and includes: a memory, a processor, and a program stored on the memory and executable on the processor. The program is executed by the processor to implement steps of the method in the first aspect.

In a fourth aspect, a computer readable storage medium is provided and includes: a program stored thereon; wherein the program is executed by a processor to implement steps of the method in the first aspect.

In embodiments of the present disclosure, the first fingerprint scanning module with a larger scanning area and a lower resolution, and the second fingerprint scanning module with a smaller scanning area and a higher resolution are provided, to dynamically switch between the first fingerprint scanning module and the second fingerprint scanning module for performing fingerprint scanning operation, based on the resolution required by the fingerprint application scenario. Compared with the solution of using one fingerprint scanning module in the related art, the present disclosure can effectively meet the high resolution required by special fingerprint application scenarios, and control the power consumption of scanning within a reasonable range, thereby ensuring endurance of a battery of the mobile terminal and having advantages of simultaneously meeting high resolution and low power consumption.

BRIEF DESCRIPTION OF THE DRAWINGS

The drawings described herein are used to provide a further understanding of the present disclosure and constitute a part of the present disclosure. The exemplary embodiments and descriptions of the present disclosure are used to explain the present disclosure, and do not constitute an improper limitation of the present disclosure. In the drawings.

DETAILED DESCRIPTION

The technical solutions in embodiments of the present disclosure will be described hereinafter in a clear and complete manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

It should be noted that an application scenario of the present disclosure may be:

a mobile terminal includes a first fingerprint scanning module and a second fingerprint scanning module; a scanning area of the first fingerprint scanning module is greater than a scanning area of the second fingerprint scanning module; and a resolution of the second fingerprint scanning module is greater than a resolution of the first fingerprint scanning module.

Figure 1:
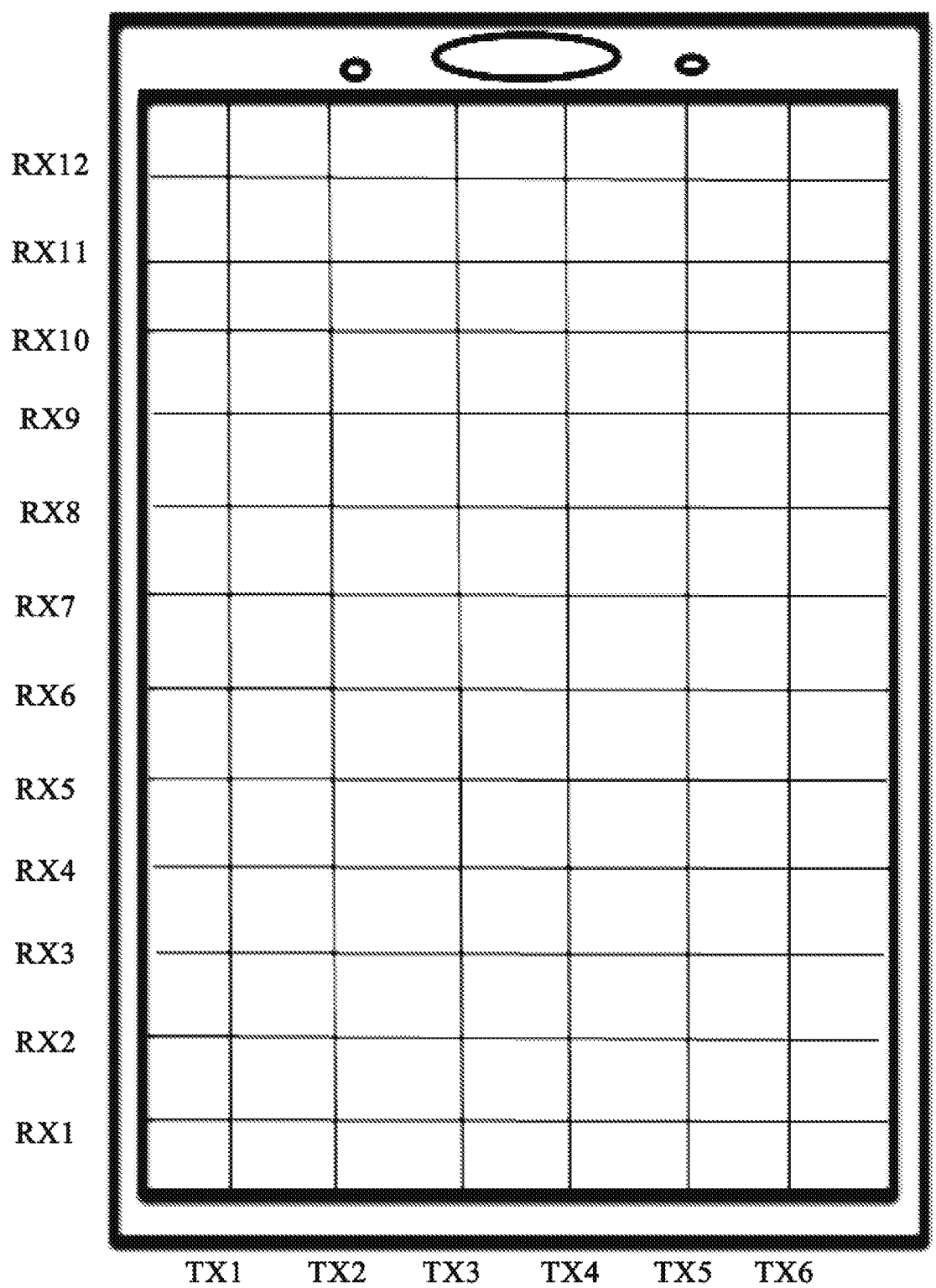
FIG. 1 is a schematic diagram of a first scanning dot matrix in a full-screen fingerprint scanning dot matrix according to an embodiment of the present disclosure.
Figure 2:
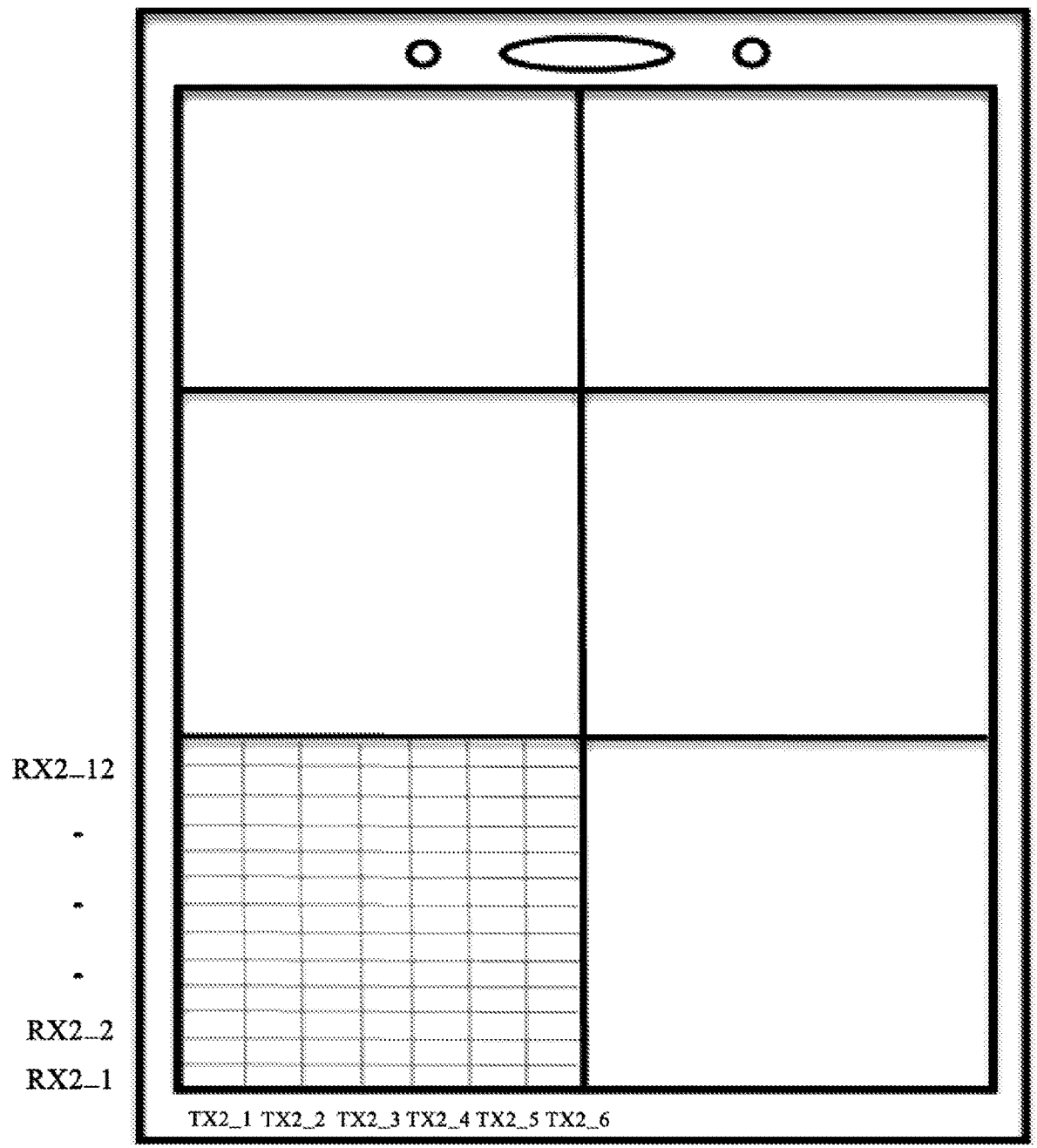
FIG. 2 is a schematic diagram of a second scanning dot matrix in a full-screen fingerprint scanning dot matrix according to an embodiment of the present disclosure.

A scanning dot matrix corresponding to the first fingerprint scanning module and a scanning dot matrix corresponding to the second fingerprint scanning module refer to a scanning dot matrix (TX1-TX6)*(RX1-RX12) shown in FIG. 1 and a scanning dot matrix (TX2_1-TX2_6)*(RX2_1-RX2_12) shown in FIG. 2, respectively. The scanning dot matrix shown in FIG. 1 may be the same as a scanning dot matrix of a full screen in the related art.

Based on this, when a user operates the mobile terminal to switch to a fingerprint application scenario, such as unlocking and paying, the first scanning dot matrix or the second scanning dot matrix may be selected for performing fingerprint scanning process, depending on categories of fingerprint application scenarios.

For classification of the fingerprint application scenarios, specific examples are as follows:

based on levels of security requirements of the fingerprint application scenarios, a fingerprint application scenario with lower security requirement is classified into a first category, for example, unlocking for waking up screen; a fingerprint application scenario with higher security requirement is classified into a second category, for example, unlocking for logging in banking software, payment, remittance.

Herein, judgment of the levels of security requirements may be generated by the mobile terminal based on big data and used as a part of factory settings. The user may also adjust the category of each fingerprint application scenario or add/delete the fingerprint application scenario in each category by entering a classification interface of the fingerprint application scenarios.

Based on the classification, for the fingerprint application scenario of the first category, the first scanning dot matrix shown in FIG. 1 may be used for scanning; for the fingerprint application scenario of the second category, the second scanning dot matrix shown in FIG. 2 may be used for scanning.

In addition, although only two scanning dot matrixes and two categories of fingerprint application scenarios are listed herein, it is not difficult for those skilled in the art to understand that three or more scanning dot matrixes, and three or more categories of fingerprint application scenarios may be applicable.

In this application scenario, a mobile terminal or a mobile communication terminal refers to a computer device that can be used in mobile, and generally includes a mobile phone, a notebook computer, a tablet computer, a POS machine, and even an on-board computer; but in most cases, it refers to a mobile phone or a smartphone with a variety of application functions and a tablet computer. For convenience of description, the following takes a mobile phone as an example for description.

The technical solutions provided in embodiments of the present specification are described in detail hereinafter with reference to the accompanying drawings.

First Example

Figure 3:
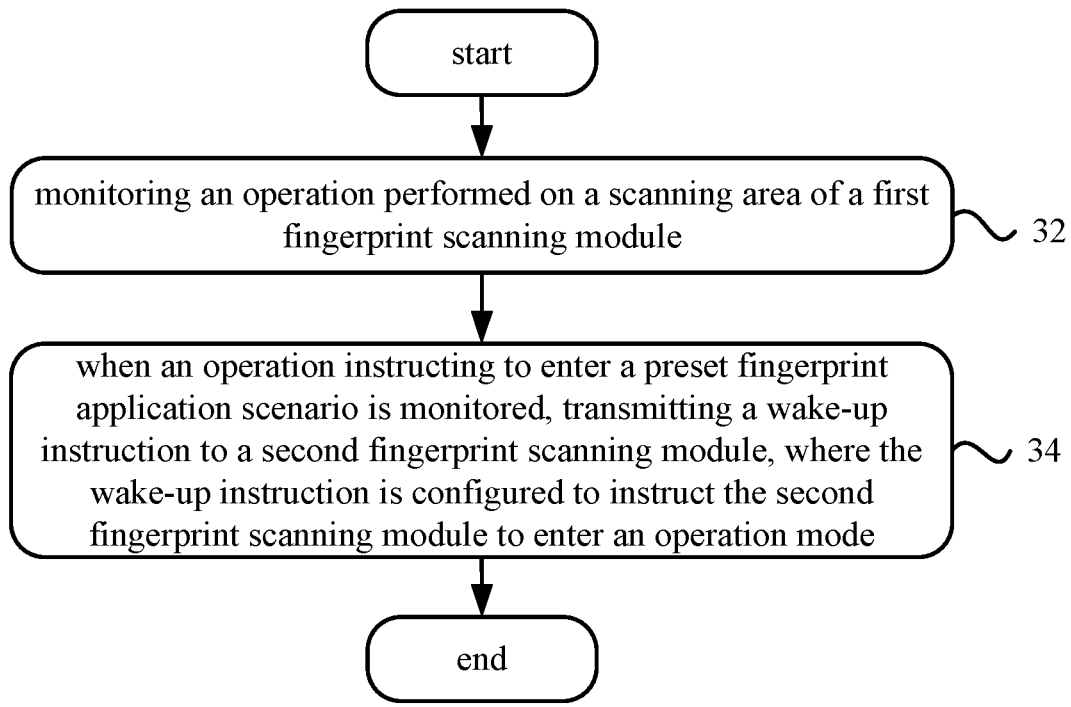
FIG. 3 is a schematic flow chart of a fingerprint scanning method according to a first embodiment of the present disclosure.

FIG. 3 is a schematic flow chart of a fingerprint scanning method according to a first embodiment of the present disclosure. Referring to FIG. 3, the method may be performed by a processor of a mobile phone, and specifically includes the following steps.

Step 32: monitoring an operation performed on a scanning area of a first fingerprint scanning module;

Step 34: when an operation instructing to enter a preset fingerprint application scenario is monitored, transmitting a wake-up instruction to a second fingerprint scanning module, where the wake-up instruction is configured to instruct the second fingerprint scanning module to enter an operation mode.

It is not difficult to understand that one implementation of the steps 32 and 34 may be as follows.

When starting a function program based on a user's operation, the mobile phone switches to a fingerprint application scenario. Meanwhile, a software corresponding to the function program can generate instruction information and transmit the instruction information to the processor of the mobile phone. The instruction information is configured to instruct to enter a preset fingerprint application scenario. Then, the processor determines whether the fingerprint application scenario is the preset fingerprint application scenario in the step 34. A specific example is as follows.

The processor of the mobile phone matches the fingerprint application scenario corresponding to the instruction information to fingerprint application scenarios in a pre-established scenario database, so as to determine a category of the fingerprint application scenario corresponding to the instruction information. For example, the scenario library is established with fingerprint application scenarios of the second category in the foregoing application scenarios as preset fingerprint application scenarios, firstly. Then, an identifier of the fingerprint application scenario corresponding to the instruction information is matched to an identifier of each fingerprint application scenario of the second category one by one, to determine whether the fingerprint application scenario corresponding to the instruction information exists in the scenario library. If the fingerprint application scenario corresponding to the instruction information exists in the scenario library, it is determined that the fingerprint application scenario corresponding to the instruction information is one preset fingerprint application scenario, then the wake-up instruction may be transmitted to the second fingerprint scanning module so that the second fingerprint scanning module is used for performing a fingerprint scanning operation. If the fingerprint application scenario corresponding to the instruction information does not exist in the scenario library, it is determined that the fingerprint application scenario corresponding to the instruction information is not one of the preset fingerprint application scenarios, then the first fingerprint scanning module is used for performing a fingerprint scanning operation.

Figure 4:
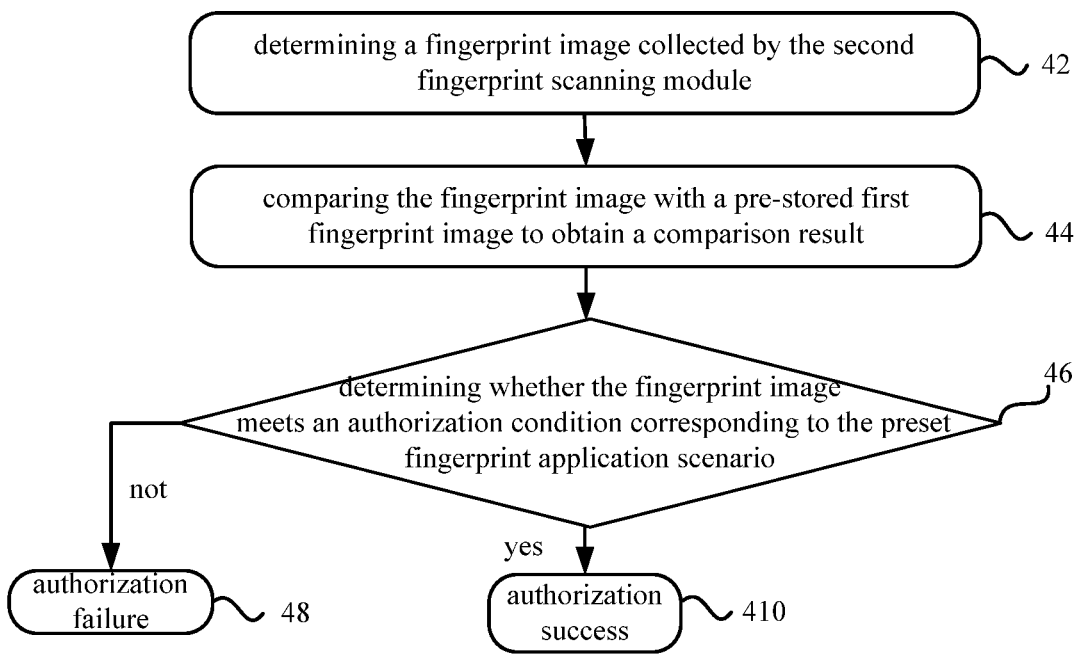
FIG. 4 is a schematic flow chart of a fingerprint recognition method according to a first embodiment of the present disclosure.

For the scenario in which the second fingerprint scanning module is used for performing fingerprint scanning operation, referring to FIG. 4, a specific fingerprint recognition process may specifically include the following steps.

Step 42: determining a fingerprint image collected by the second fingerprint scanning module.

It is not difficult to understand that after entering the operation mode, the second fingerprint scanning module drives the second scanning dot matrix to perform scanning, and the second scanning dot matrix may be exemplified by the 6*12 dot matrix shown in FIG. 2, where TX represents a transmitter and RX represents a receiver.

When the user places a finger in the scanning area of the second fingerprint scanning module, for example, a lower left corner of the mobile phone shown in FIG. 2, based on the principle of fingerprint collection described in the background art, the second fingerprint scanning module collects fingerprint data and generates a corresponding fingerprint image.

In addition, in order to facilitate the user to know a range of the scanning area of the second fingerprint scanning module, the mobile phone may perform marking processing on a target area in the touch screen of the mobile phone, and the target area is corresponding to the scanning area of the second fingerprint scanning module. Examples of marking manners include: bordering the target area, using an arrow to indicate a center point of the target area, etc.

Step 44: comparing the fingerprint image with a pre-stored first fingerprint image to obtain a comparison result.

It should be noted that resolutions required for different fingerprint application scenarios are different due to different security requirements of different fingerprint application scenarios. Therefore, in order to further improve the security and a speed of the fingerprint recognition, before the step 44, the method further includes a step of inputting a fingerprint, which may specifically be as follows.

Reference fingerprint images of corresponding resolutions are input for fingerprint application scenarios requiring different resolutions, respectively. For example, for the preset fingerprint application scenario in the foregoing step 34, a fingerprint image of the user is collected based on the resolution of the second fingerprint scanning module and is saved as the pre-stored first fingerprint image.

Based on this, one implementation of the step 44 may include:

according to the identifier of the preset fingerprint application scenario, searching for a corresponding first fingerprint image from a pre-established fingerprint image library; then, comparing the fingerprint image collected by the second fingerprint scanning module with the first fingerprint image to determine a matching degree between the two.

Step 46: determining whether the fingerprint image meets an authorization condition corresponding to the preset fingerprint application scenario.

It should be noted that one implementation of the step 46 may include:

according to the identifier of the preset fingerprint application scenario, determining an authorization condition corresponding to the preset fingerprint application scenario, for example, the matching degree is greater than 80%; it is not difficult to understand that the higher the security requirements of fingerprint application scenarios, the stricter a required authorization condition;

determining whether the matching degree between the fingerprint image and the first fingerprint image meets a required matching degree condition; if not, performing step 48; if yes, performing step 410.

Step 48: authorization failure.

Step 410: authorization success.

For the step 48 and the step 410, it is not difficult to understand that after determining the result of authorization success or authorization failure, a prompt operation may be further performed, for example, displaying the result of authorization success or authorization failure on a current interface, and prompting for performing fingerprint scanning again.

In addition, in a feasible implementation mode, since the second fingerprint scanning module has been able to complete fingerprint scanning operation, thus, in order to reduce the power consumption required for scanning the fingerprint, when it is determined that an operation instructing to enter the preset fingerprint application scenario is monitored, a sleep instruction may be transmitted to the first fingerprint scanning module to instruct the first fingerprint scanning module to enter a sleep mode, thereby avoiding unnecessary power consumption loss.

In this embodiment, it can be seen that the first fingerprint scanning module with a larger scanning area and a lower resolution, and the second fingerprint scanning module with a smaller scanning area and a higher resolution are provided. Therefore, in this embodiment, it is able to dynamically switch to the second fingerprint scanning module for performing fingerprint scanning operation, based on the resolution required by the fingerprint application scenario. Compared with the solution of using one fingerprint scanning module in the related art, the present disclosure can effectively meet the high resolution required by special fingerprint application scenarios, and control the power consumption of scanning within a reasonable range, thereby ensuring endurance of a battery of the mobile terminal and having advantages of simultaneously meeting high resolution and low power consumption.

Second Example

Figure 5:
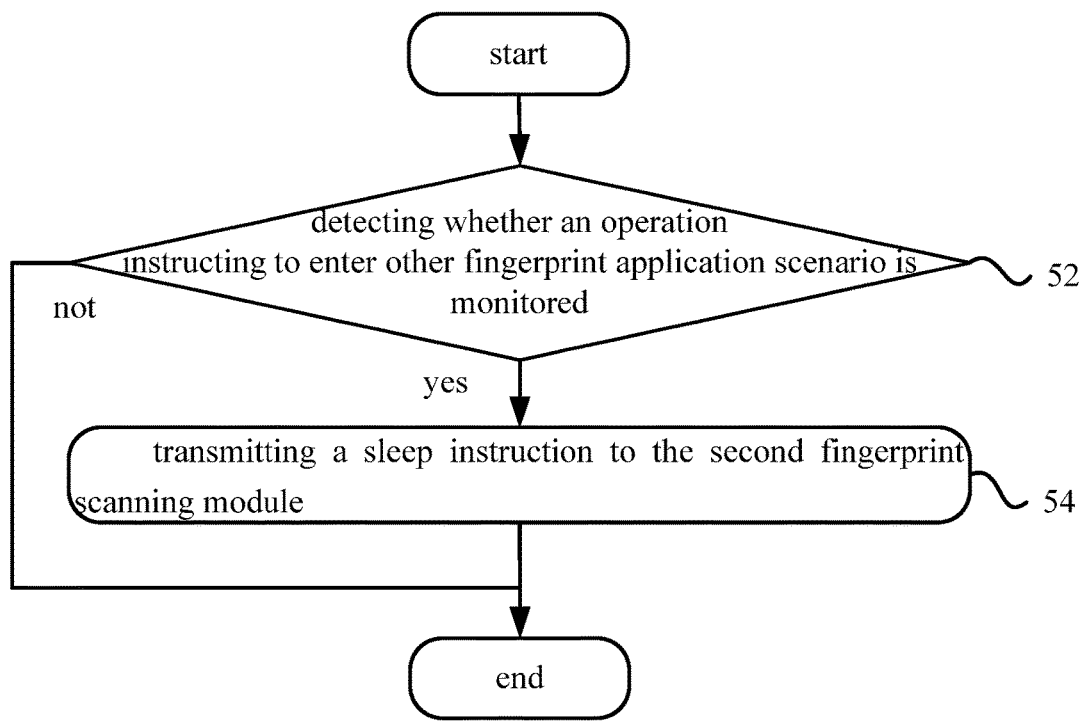
FIG. 5 is a schematic flow chart of a fingerprint scanning method according to a second embodiment of the present disclosure.

FIG. 5 is a schematic flow chart of a fingerprint scanning method according to a second embodiment of the present disclosure. Referring to FIG. 5, the method may be performed by a processor of a mobile phone, and specifically includes the following steps.

Step 52: detecting whether an operation instructing to enter other fingerprint application scenario is monitored.

It is not difficult to understand that, if yes, step 54 is performed; if not, it ends.

The step of detecting whether the instruction is received is similar to the implementation of the step 32, and therefore, details are not described herein again.

In addition, the other fingerprint application scenario in the step 52 may be a fingerprint application scenario other than the foregoing preset fingerprint application scenarios. For example, when the preset fingerprint application scenario is a fingerprint application scenario of the second category in the foregoing application scenario, the other fingerprint application scenario may be a fingerprint application scenario of the first category or an unclassified fingerprint application scenario.

Step 54: transmitting a sleep instruction to the second fingerprint scanning module.

For the step 52 and the step 54, it should be noted that, on basis of the first embodiment in which the mobile phone uses the second fingerprint scanning module to perform the fingerprint scanning operation, this embodiment further discloses a specific scheme of switching back to the first fingerprint scanning module. An implementation of this may be exemplified as:

detecting whether the first fingerprint scanning module is in an operation mode;

when it is detected that the first fingerprint scanning module is in a sleep mode, transmitting a wake-up instruction to the first fingerprint scanning module.

It is not difficult to understand that when the second fingerprint scanning module is awake previously, there may be a situation where the first fingerprint module is not instructed to enter the sleep mode. Thus, it may be first detected whether the first fingerprint module is in the sleep mode; if not, it indicates that the first fingerprint scanning module is performing a fingerprint scanning operation, and thus there is no need to wake up the first fingerprint module; if yes, it indicates that before or at the same time that the second fingerprint scanning module enters the sleep mode, the first fingerprint scanning module needs to be awakened to avoid a vacuum period in which the second fingerprint scanning module is asleep and the first fingerprint scanning module has not yet been awakened, thereby ensuring seamless connectivity of the fingerprint scanning and recognition functions of the mobile terminal during the switching process.

After the switching process is completed, for the scenario in which the first fingerprint scanning module performs the fingerprint scanning operation, a specific fingerprint recognition process may specifically include:

determining a fingerprint image collected by the first fingerprint scanning module; comparing the fingerprint image with a pre-stored second fingerprint image to obtain a comparison result; according to the comparison result, determining whether the fingerprint image meets an authorization condition corresponding to the fingerprint application scenario other than the preset fingerprint application scenario; where the second fingerprint image is collected based on the resolution of the first fingerprint scanning module.

It is not difficult to understand that the fingerprint recognition process is similar to the fingerprint recognition process shown in FIG. 4, and therefore, it will not be repeated here.

In this embodiment, it can be seen that the first fingerprint scanning module with a larger scanning area and a lower resolution, and the second fingerprint scanning module with a smaller scanning area and a higher resolution are provided. Therefore, in this embodiment, it is able to dynamically switch to the second fingerprint scanning module for performing fingerprint scanning operation, based on the resolution required by the fingerprint application scenario. Compared with the solution of using one fingerprint scanning module in the related art, the present disclosure can effectively meet the high resolution required by special fingerprint application scenarios, and control the power consumption of scanning within a reasonable range, thereby ensuring endurance of a battery of the mobile terminal and having advantages of simultaneously meeting high resolution and low power consumption.

Third Example

Figure 6:
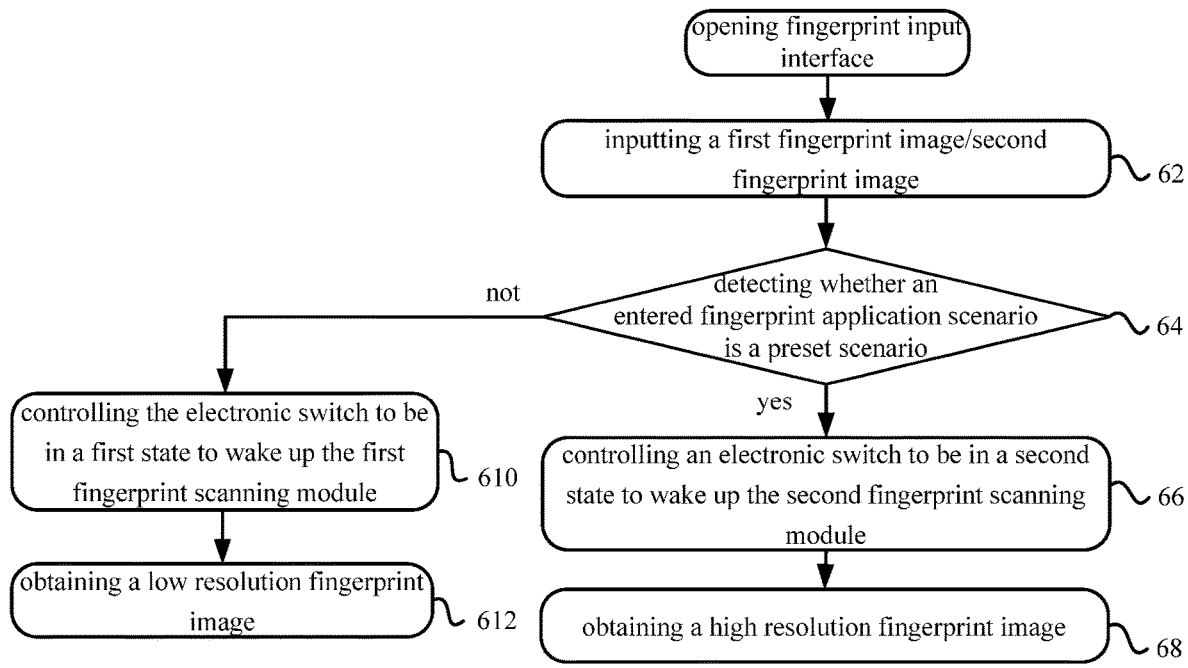
FIG. 6 is a schematic flow chart of a fingerprint scanning method according to a third embodiment of the present disclosure.

FIG. 6 is a schematic flow chart of a fingerprint scanning method according to a third embodiment of the present disclosure. Referring to FIG. 6, the method may be performed by a processor of a mobile phone, and specifically includes the following steps.

Step 62: inputting a first fingerprint image or a second fingerprint image.

It is not difficult to understand that based on a user's operation, a fingerprint input interface is displayed. The user may input a fingerprint image according to a prompt, which may include that: the user selects one category of fingerprint application scenarios, and the mobile phone wakes up the fingerprint scanning module corresponding to the one category of fingerprint application scenarios; then, the fingerprint image of the user is collected based on the awakened fingerprint scanning module and is used as a reference fingerprint image for the one category, so that a resolution of the input fingerprint image is corresponding to a resolution required by the fingerprint application scenarios of the one category.

Herein, the manner of waking up the fingerprint scanning module refers to the following description of an electronic switch.

Step 64: detecting whether an entered fingerprint application scenario is a preset scenario.

It should be noted that, when an operation instructing to enter a fingerprint application scenario is monitored, it is detected whether an identifier of the fingerprint application scenario corresponding to the instruction belongs to an identifier set of preset fingerprint application scenarios; if yes, it is determined that the fingerprint application scenario is a preset fingerprint application scenario, and step 66 is performed; if not, it is determined that the fingerprint application scenario is a non-preset fingerprint application scenario, and step 610 is performed.

Step 66: controlling an electronic switch to be in a second state to wake up the second fingerprint scanning module.

Figure 7:
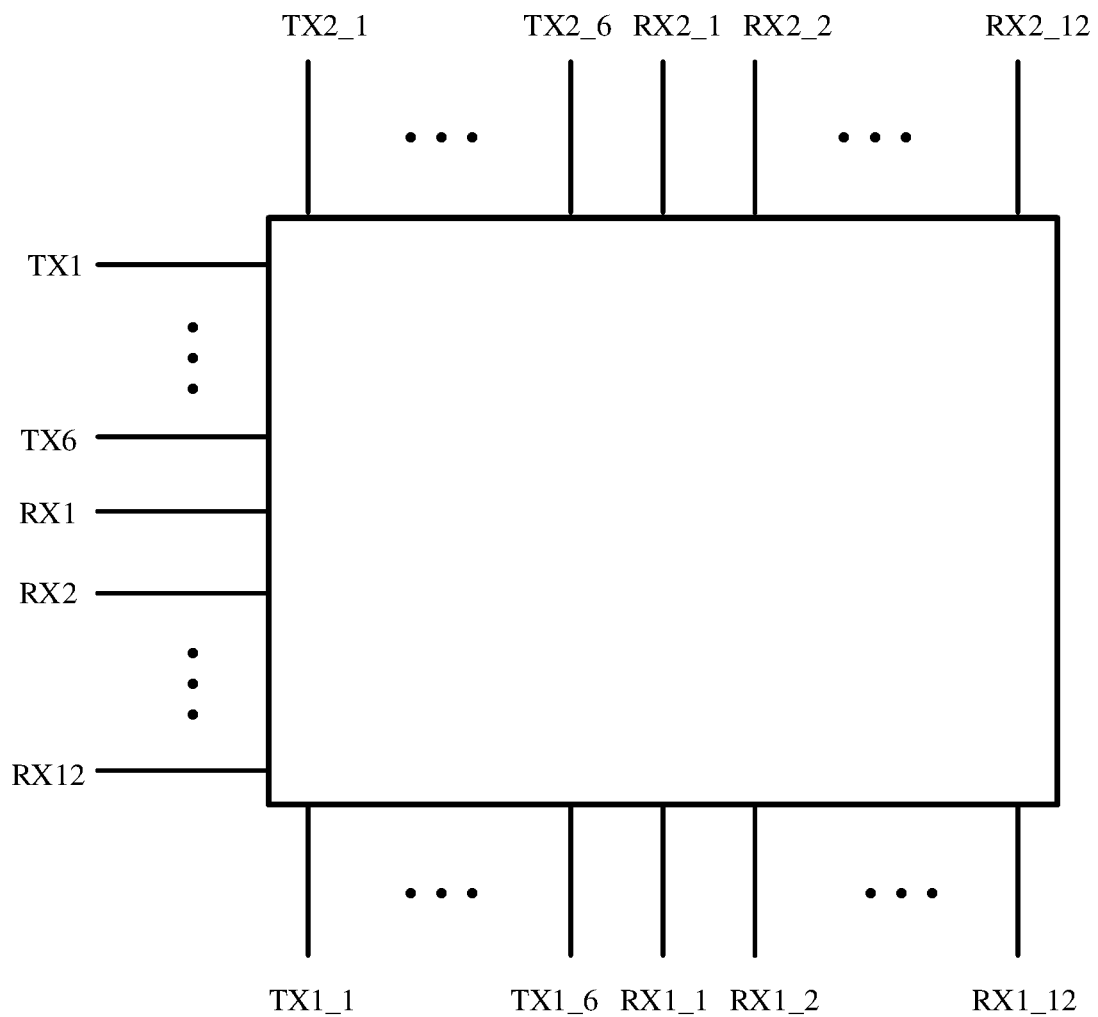
FIG. 7 is a schematic structural diagram of an electronic switch according to a third embodiment of the present disclosure.

The electronic switch is shown in FIG. 7. It should be noted that, when learning that the entered fingerprint application scenario is the preset fingerprint application scenario, the processor of the mobile phone transmits a first instruction to the electronic switch so as to switch the electronic switch to the second state, thereby switching on RX2_1-RX2_12 and TX2_1-TX2_6 to form the scanning dot matrix as shown in FIG. 2.

Step 68: obtaining a high resolution fingerprint image.

Step 610: controlling the electronic switch to be in a first state to wake up the first fingerprint scanning module.

The electronic switch is shown in FIG. 7. It should be noted that, when learning that the entered fingerprint application scenario is a non-preset fingerprint application scenario, the processor of the mobile phone transmits a second instruction to the electronic switch in order to switch the electronic switch to the first state, thereby switching on RX1_1-RX1_12 and TX1_1-TX1_6 to form the scanning dot matrix as shown in FIG. 1.

Step 612: obtaining a low resolution fingerprint image.

In addition, for the step of waking up the first fingerprint scanning module or the second fingerprint scanning module, one implementation mode may be as follows.

The first fingerprint scanning module and the second fingerprint scanning module are corresponding to a same fingerprint driving chip. The fingerprint driving chip has a built-in electronic switch as shown in FIG. 7. When the electronic switch is switched to the second state, the fingerprint driving chip can be used as the second fingerprint scanning module for driving RX2_1-RX2_12 and TX2_1-TX2_6; when the electronic switch is switched to the first state, the fingerprint driving chip can be used as the first fingerprint scanning module for driving RX1_1-RX1_12 and TX1_1-TX1_6.

Another implementation mode may be as follows.

The first fingerprint scanning module and the second fingerprint scanning module are corresponding to two fingerprint driving chips. The two fingerprint driving chips drive RX1_1-RX1_12 and TX1_1-TX1_6, RX2_1-RX2_12 and TX2_1-TX2_6, respectively. The two fingerprint driving chips are powered through the electronic switch. When the electronic switch is switched to the second state, the second fingerprint scanning module is switched on to perform a fingerprint scanning operation; when the electronic switch is switched to the first state, the first fingerprint scanning module is switched on to perform a fingerprint scanning operation.

Since subsequent steps such as fingerprint recognition and authorization, have been described in the foregoing first embodiment and/or second embodiment, details are not described herein again.

In this embodiment, it can be seen that the first fingerprint scanning module with a larger scanning area and a lower resolution, and the second fingerprint scanning module with a smaller scanning area and a higher resolution are provided. Therefore, in this embodiment, it is able to dynamically switch to the second fingerprint scanning module for performing fingerprint scanning operation, based on the resolution required by the fingerprint application scenario. Compared with the solution of using one fingerprint scanning module in the related art, the present disclosure can effectively meet the high resolution required by special fingerprint application scenarios, and control the power consumption of scanning within a reasonable range, thereby ensuring a endurance of a battery of the mobile terminal and having advantages of simultaneously meeting high resolution and low power consumption.

Fourth Example

Figure 8:
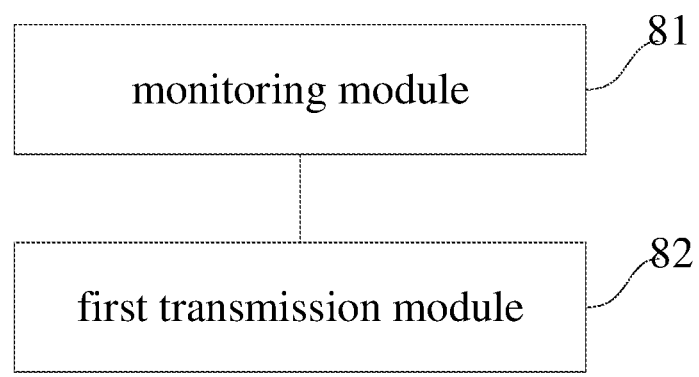
FIG. 8 is a schematic structural diagram of a mobile terminal according to a fourth embodiment of the present disclosure.

FIG. 8 is a schematic structural diagram of a mobile terminal according to a fourth embodiment of the present disclosure. Referring to FIG. 8, the mobile terminal includes a first fingerprint scanning module and a second fingerprint scanning module. The mobile terminal further includes a monitoring module 81 and a first transmission module 82.

The monitoring module 81 is configured to monitor an operation performed on a scanning area of the first fingerprint scanning module.

The first transmission module 82 is configured to, when an operation instructing to enter a preset fingerprint application scenario is monitored, transmit a wake-up instruction to the second fingerprint scanning module, where the wake-up instruction is configured to instruct the second fingerprint scanning module to enter an operation mode.

The scanning area of the first fingerprint scanning module is greater than a scanning area of the second fingerprint scanning module. A resolution of the second fingerprint scanning module is greater than a resolution of the first fingerprint scanning module.

Optionally, the mobile terminal further includes:

a second transmission module configured to, when the operation instructing to enter the preset fingerprint application scenario is monitored, transmit a sleep instruction to the first fingerprint scanning module; where the sleep instruction is configured to instruct the first fingerprint scanning module to enter a sleep mode.

Optionally, the mobile terminal further includes:

a first determining module configured to determine a fingerprint image collected by the second fingerprint scanning module;

a first comparison module configured to compare the fingerprint image with a pre-stored first fingerprint image to obtain a comparison result;

a second determining module configured to, according to the comparison result, determine whether the fingerprint image meets an authorization condition corresponding to the preset fingerprint application scenario; where the pre-stored first fingerprint image is collected based on the resolution of the second fingerprint scanning module.

Optionally, the mobile terminal further includes:

a marking module configured to perform marking processing on a target area in a touch screen of the mobile phone, where the target area is corresponding to the scanning area of the second fingerprint scanning module.

Optionally, the mobile terminal further includes:

a third transmission module configured to, when an operation instructing to enter a fingerprint application scenario other than the preset fingerprint application scenario is monitored, transmit a sleep instruction to the second fingerprint scanning module.

Optionally, the mobile terminal further includes:

a detecting module configured to detect whether the first fingerprint scanning module is in a sleep mode;

a fourth transmission module configured to, when detecting that the first fingerprint scanning module is in the sleep mode, transmit a wake-up instruction to the first fingerprint scanning module.

Optionally, the mobile terminal further includes:

a third determining module configured to determine a fingerprint image collected by the first fingerprint scanning module;

a second comparison module configured to compare the fingerprint image with a pre-stored second fingerprint image to obtain a comparison result;

a fourth determining module configured to, according to the comparison result, determine whether the fingerprint image meets an authorization condition corresponding to the fingerprint application scenario other than the preset fingerprint application scenario; where the second fingerprint image is collected based on the resolution of the first fingerprint scanning module.

The mobile terminal provided in the embodiment of the present disclosure can implement various procedures implemented by the mobile terminal in the method embodiment corresponding to FIG. 3 to FIG. 6. To avoid repetition, details are not described herein again.

In this embodiment, it can be seen that the first fingerprint scanning module with a larger scanning area and a lower resolution, and the second fingerprint scanning module with a smaller scanning area and a higher resolution are provided. Therefore, in this embodiment, it is able to dynamically switch to the second fingerprint scanning module for performing fingerprint scanning operation, based on the resolution required by the fingerprint application scenario. Compared with the solution of using one fingerprint scanning module in the related art, the present disclosure can effectively meet the high resolution required by special fingerprint application scenarios, and control the power consumption of scanning within a reasonable range, thereby ensuring endurance of a battery of the mobile terminal and having advantages of simultaneously meeting high resolution and low power consumption.

Fifth Example

Figure 9:
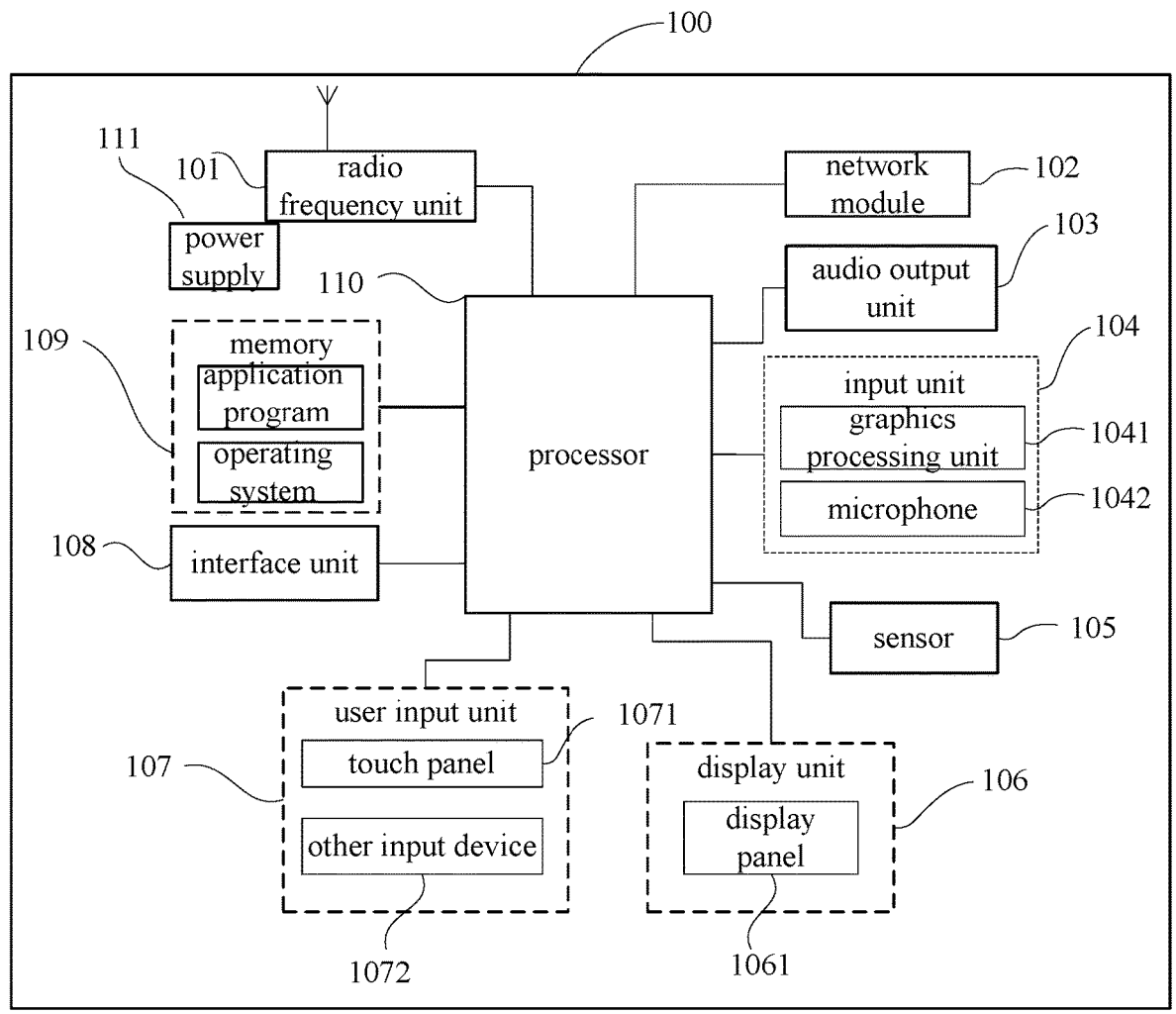
FIG. 9 is a schematic structural diagram of a mobile terminal according to a fifth embodiment of the present disclosure.

FIG. 9 is a schematic structural diagram of a mobile terminal according to a fifth embodiment of the present disclosure. Referring to FIG. 9, the mobile terminal 100 includes, but is not limited to, a radio frequency unit 101, a network module 102, an audio output unit 103, an input unit 104, a sensor 105, a display unit 106, a user input unit 107, an interface unit 108, a memory 109, a processor 110, and a power supply 111. It will be appreciated by those skilled in the art that structures of the mobile terminal shown in FIG. 9 do not constitute a limitation of a mobile terminal, which may include more or fewer components than illustrated, or have some components combined, or different component arrangements. In embodiments of the present disclosure, the mobile terminal includes, but is not limited to, a mobile phone, a tablet computer, a notebook computer, a palmtop computer, an in-vehicle terminal, a wearable device, a pedometer, and the like. The mobile terminal includes a first fingerprint scanning module and a second fingerprint scanning module. A scanning area of the first fingerprint scanning module is greater than a scanning area of the second fingerprint scanning module. A resolution of the second fingerprint scanning module is greater than a resolution of the first fingerprint scanning module.

The processor 110 is configured to, monitor an operation performed on a scanning area of the first fingerprint scanning module; when an operation instructing to enter a preset fingerprint application scenario is monitored, transmit a wake-up instruction to the second fingerprint scanning module, where the wake-up instruction is configured to instruct the second fingerprint scanning module to enter an operation mode.

In this embodiment, it can be seen that the first fingerprint scanning module with a larger scanning area and a lower resolution, and the second fingerprint scanning module with a smaller scanning area and a higher resolution are provided. Therefore, in this embodiment, it is able to dynamically switch to the second fingerprint scanning module for performing fingerprint scanning operation, based on the resolution required by the fingerprint application scenario. Compared with the solution of using one fingerprint scanning module in the related art, the present disclosure can effectively meet the high resolution required by special fingerprint application scenarios, and control the power consumption of scanning within a reasonable range, thereby ensuring endurance of a battery of the mobile terminal and having advantages of simultaneously meeting high resolution and low power consumption.

It should be understood that in some embodiments of the present disclosure, the radio frequency unit 101 may be used to receive and transmit signals during receiving and transmitting information or a call. Specifically, the radio frequency unit 101 receives downlink data from a base station and then transmits the downlink data to the processor 110 for processing. Uplink data is transmitted to the base station. Generally, the radio frequency unit 101 includes, but is not limited to, an antenna, at least one amplifier, a transceiver, a coupler, a low noise amplifier, a duplexer, and the like. In addition, the radio frequency unit 101 may also communicate with the network and other devices through a wireless communication system.

The mobile terminal provides wireless broadband internet access to the user through the network module 102, such as assisting the user in receiving and transmitting email, browsing web pages, and accessing streaming media.

The audio output unit 103 may convert the audio data received by the radio frequency unit 101 or the network module 102 or stored in the memory 109 into an audio signal and output as sound. Moreover, the audio output unit 103 may also provide audio output (e.g., call signal reception sound, message reception sound, etc.) related to a specific function performed by the mobile terminal 100. The audio output unit 103 includes a speaker, a buzzer, a receiver, and the like.

The input unit 104 is used for receiving an audio or video signal. The input unit 104 may include a graphics processing unit (Graphics Processing Unit, GPU) 1041 and a microphone 1042. The GPU 1041 processes image data of static pictures or videos obtained by an image capturing apparatus (such as a camera) in a video capturing mode or an image capturing mode. The processed image frame may be displayed on the display unit 106. The image frames processed by the graphics processor 1041 may be stored in the memory 109 (or other storage medium) or transmitted via the radio frequency unit 101 or the network module 102. The microphone 1042 can receive sound and can process such sound into audio data. The processed audio data may be converted into a format output that may be transmitted to the mobile communication base station via the radio frequency unit 101 in the case of a telephone talk mode.

The mobile terminal 100 further includes at least one sensor 105, such as a light sensor, a motion sensor, and other sensors. Specifically, the light sensor includes an ambient light sensor and a proximity sensor. The ambient light sensor can adjust brightness of a display panel 1061 according to the brightness of the ambient light. The proximity sensor can turn off the display panel 1061 and/or backlight when the mobile terminal 100 moves to the ear. As one of the motion sensors, an accelerometer sensor can detect the magnitude of the acceleration in each direction (generally three axes), can detect the magnitude and direction of the gravity when stationary, and can be used to identify the attitude of the mobile terminal (such as horizontal or vertical screen switching, related games, magnetometer attitude calibration), vibration identification related functions (such as pedometer, knocking), and the like. The sensor 105 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 106 is used to display information input by or provided to the user. The display unit 106 may include a display panel 1061, which may be configured in the form of a liquid crystal display (Liquid Crystal Display, LCD), an organic light-emitting diode (Organic Light-Emitting Diode, OLED), or the like.

The user input unit 107 may be used to receive the input number or character information, and to generate a key signal input related to the user setting and the function control of the mobile terminal. Specifically, the user input unit 107 includes a touch panel 1071 and other input devices 1072. The touch panel 1071, also referred to as a touch screen, may collect touch operations on or near the touch panel (e.g., operations on or near the touch panel 1071 using any suitable object or accessory, such as a finger, stylus, or the like). The touch panel 1071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 110, receives commands from the processor 110 and execute them. In addition, the touch panel 1071 may be implemented in various types such as a resistive type, a capacitive type, an infrared ray, and a surface acoustic wave. In addition to the touch panel 1071, the user input unit 107 may further include other input devices 1072. Specifically, other input devices 1072 may include, but are not limited to, a physical keyboard, a function key (such as a volume control key, an on-off key), a trackball, a mouse, and a joystick, which will not be elaborated herein.

Further, the touch panel 1071 may be overlaid on the display panel 1061. When the touch panel 1071 detects a touch operation on or near the touch panel, the touch panel 1071 transmits it to the processor 110 to determine a type of a touch event. Then, the processor 110 provides a corresponding visual output on the display panel 1061 according to the type of the touch event. Although in FIG. 9, the touch panel 1071 and the display panel 1061 are implemented as two separate components to implement the input and output functions of the mobile terminal, in some embodiments, the touch panel 1071 and the display panel 1061 may be integrated to implement the input and output functions of the mobile terminal, which are not specifically limited herein.

The interface unit 108 is an interface through which an external device is connected to the mobile terminal 100. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 108 may be used to receive input (e.g., data information, power, etc.) from the external device and transmit the received input to one or more elements within the mobile terminal 100 or may be used to transmit data between the mobile terminal 100 and the external device.

The memory 109 may be used to store software programs and various data. The memory 109 may mainly include a program storage area and a data storage area. The program storage area may store an operating system, an application program (such as a sound play function, an image play function) required by at least one function, and the like. The data storage area may store data (such as audio data, a phone book) created according to use of the UE. In addition, the memory 109 may include high speed random access memory, and may also include non-volatile memory, such as at least one magnetic disk storage device, flash memory device, or other volatile solid state storage device.

The processor 110 is a control center of the mobile terminal, connects various parts of the entire mobile terminal by various interfaces and lines, executes various functions of the mobile terminal and processes data by running or executing software programs and/or modules stored in the memory 109 and invoking data stored in the memory 109, thereby performing overall monitoring of the mobile terminal. The processor 110 may include one or more processing units. Optionally, the processor 110 may integrate an application processor and a modem processor. The application processor primarily processes the operating system, the user interface and the application program. The modem processor primarily processes wireless communications. It will be appreciated that the modem processor may also not be integrated into the processor 110.

The mobile terminal 100 may further include a power source 111 (such as a battery) that supplies power to the various components. Optionally, the power source 111 may be logically connected to the processor 110 through a power management system to perform functions such as managing charging, discharging, and power consumption management through the power management system.

In addition, the mobile terminal 100 includes functional modules not shown, which will not be elaborated herein.

Optionally, one embodiment of the present disclosure further provides a mobile terminal including a processor 110, a memory 109, and a computer program stored in the memory 109 and executable on the processor 110. When the computer program is executed by the processor 110, each of the processes in the fingerprint scanning method of the above embodiment is implemented, and the same technical effect can be achieved. To avoid repetition, details are not described herein.

One embodiment of the present disclosure further provides a computer readable storage medium. The computer readable storage medium stores a computer program. The computer program is executed by a processor to implement various processes of the foregoing fingerprint scanning method embodiments, and can achieve the same technical effect. To avoid repetition, details are not described herein. The computer readable storage medium, may be, for example, a read-only memory (ROM), a random access memory (Random Access Memory, RAM), a magnetic disk, or an optical disk.

The terms such as "include" and "comprises" or their variations used in the specification are intended to encompass a non-exclusive inclusion, such that a process, method, article or device that include a series of elements include not only those elements but also other elements that are not explicitly listed, or elements that are inherent to such process, method, article, or device. Without more restrictions, an element defined by the sentence "including a . . . " does not exclude existence of other identical element in the process, method, article or device that includes the element.

Through the description of the above embodiments, those skilled in the art can clearly understand that the foregoing embodiment method can be implemented by means of software plus a necessary general hardware platform, and, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, an air conditioner, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

What is claimed is:

1. A fingerprint scanning method, operable by a mobile terminal which comprises a first fingerprint scanning module and a second fingerprint scanning module; the method comprising:
    monitoring an operation performed on a scanning area of the first fingerprint scanning module;
    when an operation instructing to enter a preset fingerprint application scenario is monitored, transmitting a wake-up instruction to the second fingerprint scanning module, wherein the wake-up instruction is configured to instruct the second fingerprint scanning module to enter an operation mode;
    wherein the scanning area of the first fingerprint scanning module is greater than a scanning area of the second fingerprint scanning module; and a resolution of the second fingerprint scanning module is greater than a resolution of the first fingerprint scanning module,
    wherein the fingerprint scanning method further comprises:
    when the operation instructing to enter the preset fingerprint application scenario is monitored, transmitting a sleep instruction to the first fingerprint scanning module;
    wherein the sleep instruction is configured to instruct the first fingerprint scanning module to enter a sleep mode.

2. The method according to claim 1, wherein after the transmitting a wake-up instruction to the second fingerprint scanning module, the method further comprises:
    determining a fingerprint image collected by the second fingerprint scanning module;
    comparing the fingerprint image with a pre-stored first fingerprint image to obtain a comparison result;
    according to the comparison result, determining whether the fingerprint image meets an authorization condition corresponding to the preset fingerprint application scenario;
    wherein the pre-stored first fingerprint image is collected based on the resolution of the second fingerprint scanning module.

3. The method according to claim 1, wherein after the transmitting a wake-up instruction to the second fingerprint scanning module, the method further comprises:
    performing marking processing on a target area in a touch screen of the mobile terminal, wherein the target area is corresponding to the scanning area of the second fingerprint scanning module.

4. The method according to claim 1, wherein after the transmitting a wake-up instruction to the second fingerprint scanning module, the method further comprises:
    when an operation instructing to enter a fingerprint application scenario other than the preset fingerprint application scenario is monitored, transmitting a sleep instruction to the second fingerprint scanning module.

5. The method according to claim 4, wherein before or when transmitting a sleep instruction to the second fingerprint scanning module, the method further comprises:
    detecting whether the first fingerprint scanning module is in a sleep mode;
    when detecting that the first fingerprint scanning module is in the sleep mode, transmitting a wake-up instruction to the first fingerprint scanning module.

6. A non-transitory computer readable storage medium, comprising a program stored thereon; wherein the program is executed by a processor to implement steps of the method according to claim 1.

7. The non-transitory computer readable storage medium according to claim 6, wherein the program is executed by the processor to:
    determine a fingerprint image collected by the second fingerprint scanning module;
    compare the fingerprint image with a pre-stored first fingerprint image to obtain a comparison result;
    according to the comparison result, determine whether the fingerprint image meets an authorization condition corresponding to the preset fingerprint application scenario;
    wherein the pre-stored first fingerprint image is collected based on the resolution of the second fingerprint scanning module.

8. The non-transitory computer readable storage medium according to claim 6, wherein the program is executed by the processor to:
    perform marking processing on a target area in a touch screen of the mobile terminal, wherein the target area is corresponding to the scanning area of the second fingerprint scanning module, after the transmitting a wake-up instruction to the second fingerprint scanning module.

9. The non-transitory computer readable storage medium according to claim 6, wherein the program is executed by the processor to: after the transmitting a wake-up instruction to the second fingerprint scanning module,
    when an operation instructing to enter a fingerprint application scenario other than the preset fingerprint application scenario is monitored, transmit a sleep instruction to the second fingerprint scanning module.

10. The non-transitory computer readable storage medium according to claim 9, wherein the program is executed by the processor to: before or when transmitting a sleep instruction to the second fingerprint scanning module,
    detect whether the first fingerprint scanning module is in a sleep mode; and
    when detecting that the first fingerprint scanning module is in the sleep mode, transmit a wake-up instruction to the first fingerprint scanning module.

11. A mobile terminal, comprising:
    a first fingerprint scanning module;
    a second fingerprint scanning module;
    a monitoring module configured to monitor an operation performed on a scanning area of the first fingerprint scanning module;
    a first transmission module configured to, when an operation instructing to enter a preset fingerprint application scenario is monitored, transmit a wake-up instruction to the second fingerprint scanning module, wherein the wake-up instruction is configured to instruct the second fingerprint scanning module to enter an operation mode;
    wherein the scanning area of the first fingerprint scanning module is greater than a scanning area of the second fingerprint scanning module; a resolution of the second fingerprint scanning module is greater than a resolution of the first fingerprint scanning module, wherein the mobile terminal further comprises:
a second transmission module configured to, when the operation instructing to enter the preset fingerprint application scenario is monitored, transmit a sleep instruction to the first fingerprint scanning module; wherein the sleep instruction is configured to instruct the first fingerprint scanning module to enter a sleep mode.

12. The mobile terminal according to claim 11, further comprising:
a first determining module configured to determine a fingerprint image collected by the second fingerprint scanning module;
a first comparison module configured to compare the fingerprint image with a pre-stored first fingerprint image to obtain a comparison result;
a second determining module configured to, according to the comparison result, determine whether the fingerprint image meets an authorization condition corresponding to the preset fingerprint application scenario; wherein the pre-stored first fingerprint image is collected based on the resolution of the second fingerprint scanning module.

13. The mobile terminal according to claim 11, further comprising:
a marking module configured to perform marking processing on a target area in a touch screen of the mobile terminal, wherein the target area is corresponding to the scanning area of the second fingerprint scanning module.

14. The mobile terminal according to claim 11, further comprising:
a third transmission module configured to, when an operation instructing to enter a fingerprint application scenario other than the preset fingerprint application scenario is monitored, transmit a sleep instruction to the second fingerprint scanning module.

15. The mobile terminal according to claim 14, further comprising:
a detecting module configured to detect whether the first fingerprint scanning module is in a sleep mode;
a fourth transmission module configured to, when detecting that the first fingerprint scanning module is in the sleep mode, transmit a wake-up instruction to the first fingerprint scanning module.

16. A mobile terminal, comprising: a first fingerprint scanning module, a second fingerprint scanning module, a memory, a processor, and a program stored on the memory and executable on the processor; wherein the program is executed by the processor to:

monitor an operation performed on a scanning area of the first fingerprint scanning module;
when an operation instructing to enter a preset fingerprint application scenario is monitored, transmit a wake-up instruction to the second fingerprint scanning module, wherein the wake-up instruction is configured to instruct the second fingerprint scanning module to enter an operation mode;
wherein the scanning area of the first fingerprint scanning module is greater than a scanning area of the second fingerprint scanning module; a resolution of the second fingerprint scanning module is greater than a resolution of the first fingerprint scanning module,
wherein the processor is configured to:
when the operation instructing to enter the preset fingerprint application scenario is monitored, transmit a sleep instruction to the first fingerprint scanning module; wherein the sleep instruction is configured to instruct the first fingerprint scanning module to enter a sleep mode.

17. The mobile terminal according to claim 16, wherein the processor is configured to:
determine a fingerprint image collected by the second fingerprint scanning module;
compare the fingerprint image with a pre-stored first fingerprint image to obtain a comparison result;
according to the comparison result, determine whether the fingerprint image meets an authorization condition corresponding to the preset fingerprint application scenario; wherein the pre-stored first fingerprint image is collected based on the resolution of the second fingerprint scanning module.

18. The mobile terminal according to claim 16, wherein the processor is configured to:
perform marking processing on a target area in a touch screen of the mobile terminal, wherein the target area is corresponding to the scanning area of the second fingerprint scanning module.

19. The mobile terminal according to claim 16, wherein the processor is configured to:
when an operation instructing to enter a fingerprint application scenario other than the preset fingerprint application scenario is monitored, transmit a sleep instruction to the second fingerprint scanning module.

20. The mobile terminal according to claim 19, wherein the processor is configured to:
detect whether the first fingerprint scanning module is in a sleep mode;
when detecting that the first fingerprint scanning module is in the sleep mode, transmit a wake-up instruction to the first fingerprint scanning module.

* * * * *